United States Patent
Zhang et al.

(10) Patent No.: US 10,043,486 B2
(45) Date of Patent: Aug. 7, 2018

(54) ELECTRONIC DEVICE AND METHOD FOR CONTROLLING SCREEN-REFRESH RATE

(71) Applicant: MediaTek Singapore Pte. Ltd., Singapore (SG)

(72) Inventors: Xuecheng Zhang, Beijing (CN); Weiguo Li, Beijing (CN)

(73) Assignee: MEDIATEK SINGAPORE PTE. LTD., Singapore (SG)

(*) Notice: Subject to any disclaimer, the term of this patent is extended or adjusted under 35 U.S.C. 154(b) by 190 days.

(21) Appl. No.: 15/098,595

(22) Filed: Apr. 14, 2016

(65) Prior Publication Data
US 2017/0040001 A1 Feb. 9, 2017

(30) Foreign Application Priority Data

Aug. 4, 2015 (CN) .......................... 2015 1 0469659

(51) Int. Cl.
*G06F 3/038* (2013.01)
*G09G 5/18* (2006.01)
*G06F 3/041* (2006.01)
*G09G 5/00* (2006.01)
*G06F 3/0488* (2013.01)

(52) U.S. Cl.
CPC .............. *G09G 5/18* (2013.01); *G06F 3/041* (2013.01); *G06F 3/0488* (2013.01); *G09G 5/00* (2013.01); *G09G 2330/021* (2013.01); *G09G 2340/0435* (2013.01)

(58) Field of Classification Search
CPC .. G09G 5/18; G09G 5/00; G06F 3/041; G06F 3/038; G01R 27/26; G06K 11/06; G08C 21/00
See application file for complete search history.

(56) References Cited

U.S. PATENT DOCUMENTS

| 2013/0265294 | A1* | 10/2013 | Kim | G09G 3/20 345/214 |
| 2014/0062907 | A1* | 3/2014 | Kim | G06F 3/038 345/173 |
| 2015/0194137 | A1 | 7/2015 | Wyatt | |
| 2016/0195988 | A1* | 7/2016 | Fu | G06F 3/0416 345/174 |
| 2016/0370915 | A1* | 12/2016 | Agarwal | G06F 3/0416 |

FOREIGN PATENT DOCUMENTS

TW M400341 U1 3/2011

* cited by examiner

*Primary Examiner* — Pegeman Karimi
(74) *Attorney, Agent, or Firm* — McClure, Qualey & Rodack, LLP

(57) ABSTRACT

The present invention provides an electronic device, including a storage module, a sensing module, a processing module, a driving module, and a display module. The storage module stores a plurality of frames. The sensing module outputs a sensing signal according to an action by the electronic device. The processing module outputs a transmitting signal according to the sensing signal. The transmitting signal corresponds to a first screen-refresh rate. The driving module determines the subsequent frame according to either the transmitting signal or a driving signal before the current frame ends. The driving signal corresponds to a second screen-refresh rate. The display module displays a display picture corresponding to the subsequent frame according to the subsequent frame and either the first screen-refresh rate or the second screen-refresh rate.

20 Claims, 6 Drawing Sheets

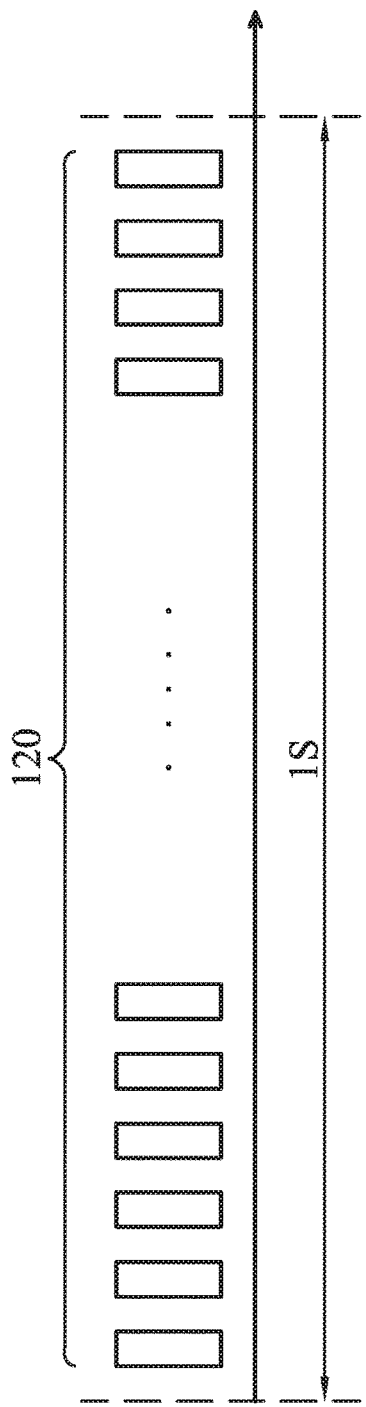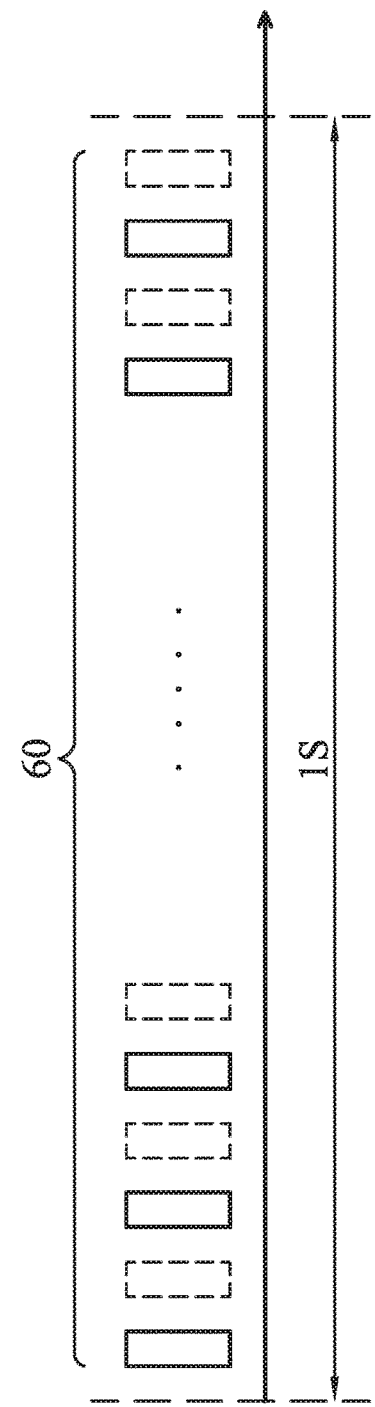

ELECTRONIC DEVICE AND METHOD FOR CONTROLLING SCREEN-REFRESH RATE

CROSS REFERENCE TO RELATED APPLICATIONS

This Application claims priority of China Patent Application No. 201510469659.6, filed on Aug. 4, 2015, the entirety of which is incorporated by reference herein.

BACKGROUND OF THE INVENTION

Field of the Invention

The application relates in general to an electronic device and a method for controlling the screen-refresh rate, and in particular to an electronic device and a method for controlling the screen-refresh rate by switching the screen-refresh rate of a display module according to an action by the electronic device.

Description of the Related Art

With technological advancements and in the pursuit of better visual effects, there is greater demand for fluency on screens of games and videos. However, when an electronic device uses a lower screen-refresh rate and the user operates the application by moving the electronic device, there may be a delay in the display picture due to large movements, and this might provide the user with a poor user experience. Thus, more and more electronic devices support a high screen-refresh rate. On the other hand, when the electronic device displays a static scene, or a scene that does not change too much, a higher screen-refresh rate might cause higher power consumption. Thus, the electronic device must adjust the screen-refresh rate according to the different demands of each scene, to find a balance between the screen display effect and power consumption. This means that the electronic device must maintain the display effect under different scenes, and the power consumption of the electronic device must also be minimized.

BRIEF SUMMARY OF INVENTION

An embodiment of the present invention provides an electronic device, including a storage module, a sensing module, a processing module, a driving module, and a display module. The storage module is configured to store a plurality of frames. The sensing module is configured to output a sensing signal according to an action by the electronic device. The processing module is configured to output a transmitting signal according to the sensing signal. The transmitting signal corresponds to a first screen-refresh rate. The driving module is configured to determine a subsequent frame according to either the transmitting signal or a driving signal before the current frame ends. The driving signal corresponds to a second screen-refresh rate. The display module is configured to display a display picture corresponding to the subsequent frame according to the subsequent frame and one of the first screen-refresh rate and the second screen-refresh rate.

Another embodiment of the present invention provides a method for controlling a screen-refresh rate, adapted to an electronic device. The steps include: outputting a sensing signal according to an action by the electronic device by a sensing module; outputting a transmitting signal according to the sensing signal by a processing module, wherein the transmitting signal corresponds to a first screen-refresh rate; determining the subsequent frame according to either the transmitting signal or the driving signal before a current frame ends by a driving module, wherein the driving signal corresponds to a second screen-refresh rate; and displaying a display picture corresponding to the subsequent frame according to the subsequent frame and either the first screen-refresh rate or the second screen-refresh rate.

According to an embodiment of the present invention, the first screen-refresh rate is greater than the second screen-refresh rate.

According to an embodiment of the present invention, when the driving module receives the transmitting signal before the current frame ends, the driving module accesses and outputs one of the plurality of frames from the storage module as the subsequent frame, and the display module displays the display picture corresponding to the subsequent frame according to the first screen-refresh rate and the subsequent frame.

According to an embodiment of the present invention, when the driving module does not receive the transmitting signal before the current frame ends, the driving module instructs the display module to display a corresponding display picture according to the second screen-refresh rate and the plurality of frames stored in the storage module.

According to an embodiment of the present invention, the first screen-refresh rate is 120 Hz, and the second screen-refresh rate is 60 Hz.

According to an embodiment of the present invention, the sensing module is a gyroscope, a magnetometer, an accelerometer, or a touch-sensing module.

According to an embodiment of the present invention, when the sensing module is a touch-sensing module, the processing module further determines the distance between the start position and the end position corresponding to a touch event on the touch-sensing module. When the distance is less than a predetermined distance, the processing module does not output the transmitting signal, and the driving module determines the subsequent frame according to the driving signal. When the distance is greater than or equal to the predetermined distance, the processing module outputs the transmitting signal, and the driving module determines the subsequent frame according to the transmitting signal.

According to an embodiment of the present invention, when the sensing module is a gyroscope, the processing module further determines the spatial variation corresponding to any axis, any two axes, or all the x/y/z axes of the electronic device. When the spatial variation is less than a predetermined threshold, the processing module does not output the transmitting signal, and the driving module determines the subsequent frame according to the driving signal. When the spatial variation is greater than or equal to the predetermined threshold, the processing module outputs the transmitting signal, and the driving module determines the subsequent frame according to the transmitting signal.

According to an embodiment of the present invention, when the sensing module is a magnetometer, the processing module further determines the spatial variation corresponding to the magnetic field directions of the magnetometer. When the spatial variation is less than a predetermined threshold, the processing module does not output the transmitting signal, and the driving module determines the subsequent frame according to the driving signal. When the spatial variation is greater than or equal to the predetermined threshold, the processing module outputs the transmitting signal, and the driving module determines the subsequent frame according to the transmitting signal.

According to an embodiment of the present invention, when the sensing module is an accelerometer, the processing module further determines an acceleration of the electronic device. When the acceleration is less than a predetermined threshold, the processing module does not output the transmitting signal, and the driving module determines the subsequent frame according to the driving signal. When the acceleration is greater than or equal to the predetermined threshold, the processing module outputs the transmitting signal, and the driving module determines the subsequent frame according to the transmitting signal.

Another embodiment of the present invention provides an electronic device, including a storage module, a sensing module, a processing module, a driving module, and a display module. The storage module is configured to store a user's pre-set brightness value. The sensing module is configured to output a sensing signal according to an action by the electronic device. The processing module is configured to output a transmitting signal according to the sensing signal. The transmitting signal corresponds to the user's pre-set brightness value. The driving module is configured to determine the brightness value of a display module according to the transmitting signal. The display module configures the user's pre-set brightness value according to the transmitting signal. An initial setting of the display module is a first brightness value, and the user's pre-set brightness value is greater than the first brightness value.

Another embodiment of the present invention provides a method for controlling the screen-refresh rate, adapted to an electronic device. The steps include: storing a user's pre-set brightness value in a storage module; the sensing module outputs a sensing signal according to an action by the electronic device; the processing module outputs a transmitting signal according to the sensing signal, wherein the transmitting signal corresponds to the user's pre-set brightness value; the driving module determines the brightness value of the display module according to the transmitting signal; the display module configures the user's pre-set brightness value according to the transmitting signal, wherein an initial setting of the display module is a first brightness value, and the user's pre-set brightness value is greater than the first brightness value.

According to an embodiment of the present invention, the electronic device further comprises a timer, configured to start timing when the display module configures the user's pre-set brightness value. When the timer expires and the processing module does not receive the sensing signal within a predetermined time, the display module reconfigures the second brightness value.

According to an embodiment of the present invention, the storage module also stores a plurality of brightness values that have been pre-set by the user, the processing module outputs a plurality of transmitting signals that correspond to the plurality of the user's pre-set brightness values according to the sensing signal, and the driving module determines the brightness value of the display module according to the plurality of transmitting signals.

BRIEF DESCRIPTION OF DRAWINGS

The invention can be more fully understood by reading the subsequent detailed description and examples with references made to the accompanying drawings, wherein:

FIGS. 2A and 2B are schematic drawings of the refreshed screen display corresponding to the first screen-refresh rate and the second screen-refresh rate in accordance with an embodiment of the present invention;

DETAILED DESCRIPTION OF INVENTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "coupled" is intended to mean either an indirect or direct electrical connection. Accordingly, if one device is electrically connected to another device, that connection may be through a direct electrical connection, or through an indirect electrical connection via other devices and connections.

Further areas to which the present systems and methods can be applied will become apparent from the detailed description provided herein. It should be understood that the detailed description and specific examples, while indicating exemplary embodiments of the electronic device and the method for controlling a screen-refresh rate, are intended for the purposes of illustration only and are not meant to limit the scope of the invention.

Figure 1:
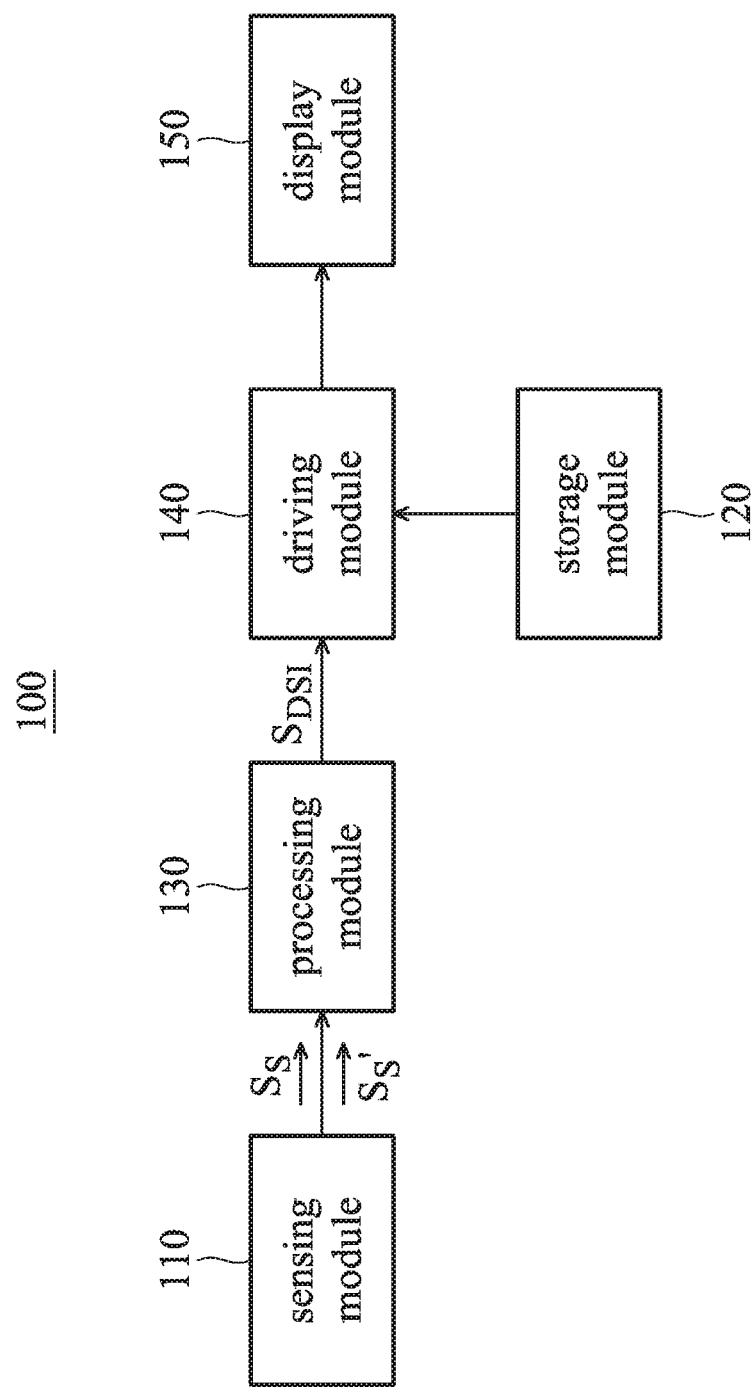
FIG. 1 is a schematic drawing of an electronic device in accordance with an embodiment of the present invention.

FIG. 1 is a schematic drawing of an electronic device in accordance with an embodiment of the present invention. As shown in FIG. 1, the electronic device 100 may include a sensing module 110, a storage module 120, a processing module 130, a driving module 140, and a display module 150. For example, the sensing module 110 may be a gyroscope, a magnetometer, an accelerometer, or a touch-sensing module, which is configured to output a sensing signal according to an action by the electronic device 100. The action by the electronic device 100 may be a spatial variation of the three-dimensional, e.g. the x/y/z axes, corresponding to the gyroscope, a variation of the magnetic field directions of the magnetometer, a variation of the acceleration of the accelerometer or a touch event on the screen of the electronic device 100 corresponding to the touch-sensing module. The storage module 120 may be a memory, which is configured to store a plurality of frames. The processing module 130 may be a Central Processing Unit or a Graphics Processing Unit, which is configured to output the transmitting signal according to the sensing signal. The driving module 140 may be a display driver integrated circuit (DDIC), which is configured to determine whether the transmitting signal is received before the current frame ends. The driving module 140 further determines the subsequent frame according to the transmitting signal or a driving signal. The driving signal is an internal signal of the driving module which is used to maintain an original screen-refresh rate. The sensing signal corresponds to a first screen-refresh rate, and the driving signal corresponds to a second screen-refresh rate. The display module 150 may be an Organic Light-Emitting Diode display array, which is configured to display a picture corresponding to the subsequent frame output from the driving module 140 according to either the first screen-refresh rate or the second screen-refresh rate.

Figure 3:
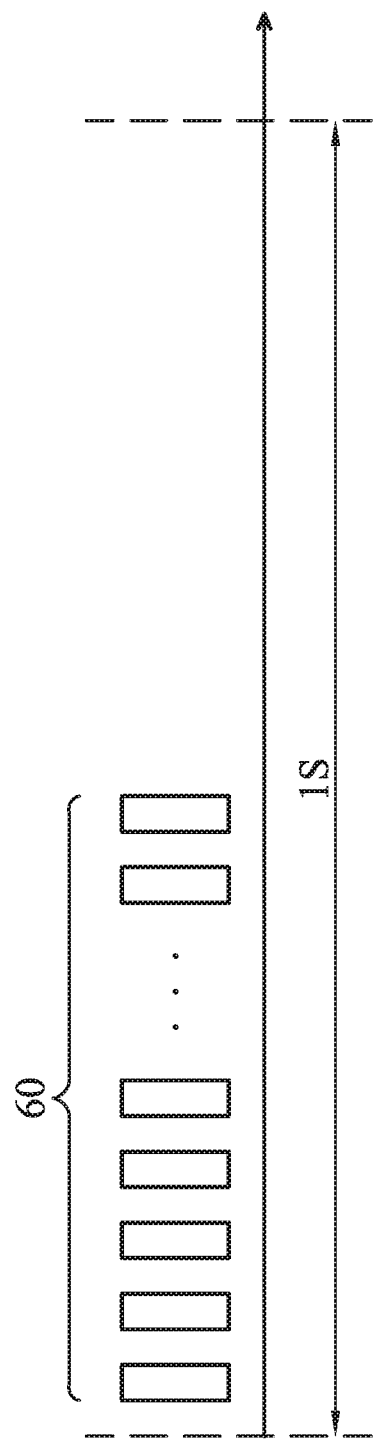
FIG. 3 is a schematic drawing of the refreshed screen display which has a screen-refresh rate of 60 Hz in accordance with the prior art.

FIGS. 2A and 2B are schematic drawings of the refreshed screen display corresponding to the first screen-refresh rate and the second screen-refresh rate. In the embodiment, the first screen-refresh rate is 120 Hz (or it may be presented as 120 FPS), and the second screen-refresh rate is 60 Hz (or it may be presented as 60 FPS). FIG. 2A corresponds to the first screen-refresh rate, which means that the display module 150 is driven by the driving module 140 for refreshing 120 frames per second, and each frame is assigned to about 8.3 ms. FIG. 2B corresponds to the second screen-refresh rate, which means that the display module 150 is driven by the driving module 140 for refreshing 60 frames per second, and each frame is assigned to about 16.6 ms. As shown in FIG. 3, in the prior art, when the screen-refresh rate is 60 Hz, the display module 150 often refreshes 60 frames in the first half second with 120 Hz, and does not refresh any frame in the last half second. However, in the embodiment, when the screen-refresh rate is 60 Hz, the driving module 140 outputs 60 frames by alternating between an active frame and a skip frame. For example, as shown in FIG. 2B, the squares with solid lines represent the active frames, and the squares with dotted lines represent the skip frames. The active frame is the frame which is accessed from the storage module 120, and the skip frame is the frame which is not refreshed and is the same as the previous frame. Because the skip frame is maintained as the previous frame, the power consumption of the display module 150 may effectively be reduced.

Figure 4A:
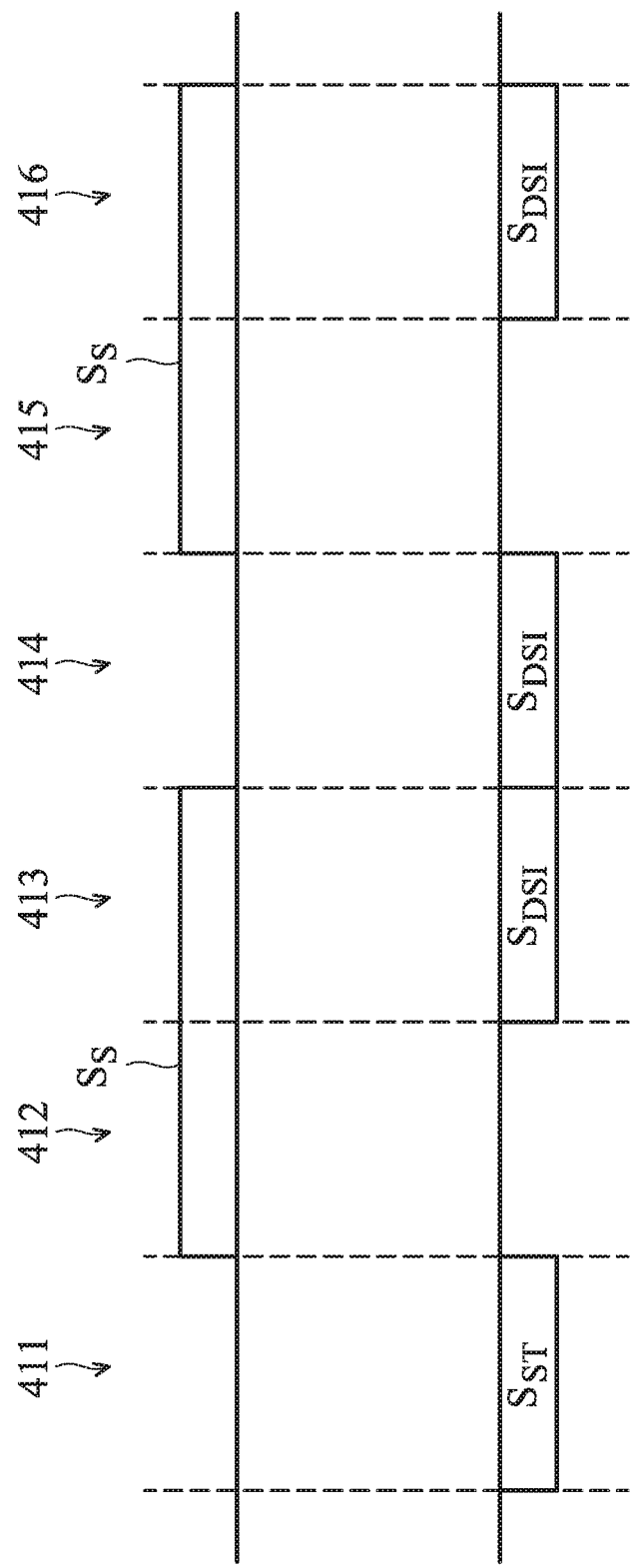
FIGS. 4A and 4B are schematic drawings for switching between different screen-refresh rates in accordance with an embodiment of the present invention.
Figure 4B:
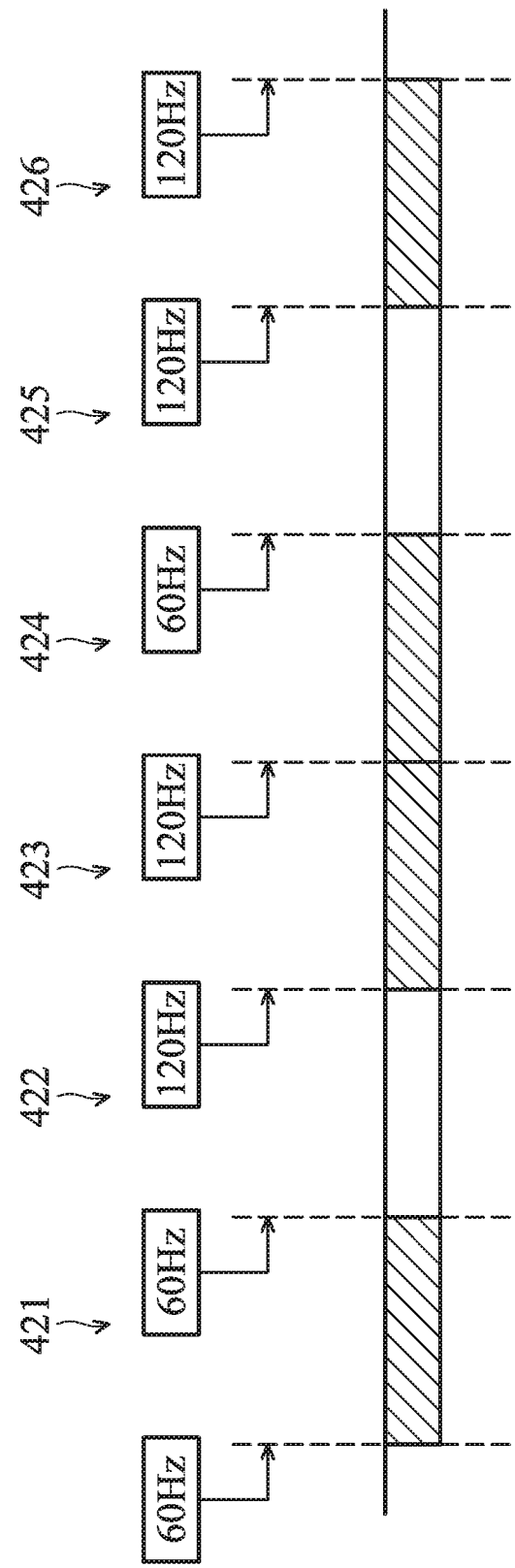

Please refer to FIGS. 4A and 4B with FIGS. 2A and 2B. FIG. 4A and 4B are schematic drawings for switching between different screen-refresh rates in accordance with an embodiment of the present invention. In the embodiment, the first screen-refresh rate is 120 Hz, and the second screen-refresh rate is 60 Hz. It should be noted that the setting of the screen-refresh rate as described above is only an embodiment of the present invention, and it is not limited thereto. In other embodiments, the first screen-refresh rate may also be set to "60 Hz", and the second screen-refresh rate may be set to "30 Hz". As shown in FIG. 4A, grids 411~416 represent the processing flow implemented in the processing module 130. As shown in FIG. 4B, grids 421~426 represent the processing flow implemented in the driving module 140 which are synchronized with the grids 411~416. In the grid 411, the processing module 130 enables the driving module 140 to drive the display module 150 for displaying the display picture in the second screen-refresh rate. Hence, the processing module 130 outputs the starting signal $S_{ST}$ to the driving module 140, and the driving module 140 refreshes the screen with the original frequency of 60 frames per second. Because the processing module 130 has outputted the starting signal $S_{ST}$ to the driving module 140 in the grid 411, in the grid 421 which is synchronized with the grid 411, the driving module 140 accesses and outputs a frame from the storage module 120 according to the starting signal $S_{ST}$, which means that the output frame in the grid 421 is the active frame (shown as the slash). Then, the display module 150 synchronously displays the display picture corresponding to the output frame from the driving module 140. Otherwise, in the grid 412 which is synchronized with the grid 422, because the processing module 130 does not receive the sensing signal $S_S$ from the sensing module 110 before the grid 411 ends, the processing module 130 does not output the transmitting signal $S_{DSI}$ to the driving module 140. The driving module 140 maintains the frequency of 60 Hz, and does not access and output a frame from the storage module 120 in the grid 422, which means that the frame output in the grid 422 is the skip frame. Then, the display module 150 does not refresh the screen, and maintains the display picture which is the same as the previous frame. The screen-refresh rate in the grids 421~422 is 60 Hz. The sensing signal $S_S$ may be a spatial variation of the x/y/z axes corresponding to the gyroscope; a variation in the magnetic field directions of the magnetometer; a variation of the acceleration of the accelerometer; or a touch event on the screen of the electronic device corresponding to the touch-sensing module. In the embodiment, the transmitting signal $S_{DSI}$ is defined by Display Serial Interface (DSI) protocol which conforms to the MIPI protocol, but it is not limited thereto.

In the grids 413~414, because the sensing module 110 outputs the sensing signal $S_S$ at the beginning of the grid 412, the processing module 130 determines that the electronic device 100 acts, such as using the gyroscope to operate the game control, using the magnetometer to view the map, or moving the user interface with the touch event. The processing module 130 outputs the transmitting signal $S_{DSI}$ to the driving module 140 at the beginning of the grid 413, and the driving module 140 accesses and outputs a frame from the storage module 120 according to the transmitting signal $S_{DSI}$ in the grid 423 which is synchronized with the grid 413, which means that the frame output in the grid 423 is the active frame. Then, the display module 150 synchronously displays the display picture corresponding to the output frame from the driving module 140. Before the grid 413 ends, the processing module 130 continuously receives the sensing signal $S_S$, and the processing module 130 continuously uses the screen-refresh rate of 120 Hz to refresh the display module 150. Thus, the processing module 130 outputs the transmitting signal $S_{DSI}$ to the driving module 140. The driving module 140 accesses and outputs another frame from the storage module 140 according to the transmitting signal $S_{DSI}$ in the grid 424 which is synchronized with the grid 414, which means that the output frame in the grid 424 is the active frame. The display module 150 synchronously displays the display picture corresponding to another frame from the driving module 140. The screen-refresh rate in the grids 423~424 is 120 Hz.

In the grids 415~416, because the sensing module 110 stops outputting the sensing signal $S_S$ before the grid 414 ends, the processing module 130 uses the original screen-refresh rate (i.e. 60 Hz) to refresh the display module 150, and does not output the transmitting signal $S_{DSI}$ in the grid 415. The driving module 140 does not access and output a frame from the storage module 120 in the grid 425 which is synchronized with the grid 415, which means that the frame output in the grid 425 is the skip frame. The display module 150 does not refresh the screen, and maintains the display picture which is the same as the previous frame in the grid 424. Otherwise, in the grid 416, because the sensing module 110 starts to output the sensing signal $S_S$ at the beginning of the grid 415, and the processing module 130 determines that the electronic device 100 acts. The processing module 130 outputs the transmitting signal $S_{DSI}$ to the driving module 140 at the beginning of the grid 416, and the driving module 140 accesses and outputs another frame from the storage module 120 according to the transmitting signal $S_{DSI}$ in the grid 426 which is synchronized with the grid 416, which means that the output frame in the grid 426 is the active frame. Then, the display module 150 synchronously displays the display picture corresponding to another frame from the driving module 140. The screen-refresh rate in grid 425 is 60 Hz, and the screen-refresh rate in grid 426 is 120 Hz.

It should be noted that the driving module 140 has to maintain the original screen-refresh rate of 60 Hz of the display module 150, thus when the output frame in the grid 425 is the skip frame, even when the sensing module 110 does not output the sensing signal $S_S$ in the grid 415, which means that the processing module 130 does not receive the sensing signal $S_S$. The driving module 140 still accesses and outputs another frame from the storage module 120 in the grid 426 which is synchronized with the grid 216 for maintaining the screen-refresh rate of 60 Hz, which means that the output frame in the grid 426 is the active frame. But in this case, because the processing module 130 does not receive the sensing signal $S_S$, the screen-refresh rate in the grid 426 is still 60 Hz.

According to another embodiment of the invention, the sensing module 110 further outputs different sensing signals according to the variation in the space sensed. For example, when the sensing module 110 is a touch-sensing module, the processing module 130 further determines whether to output the transmitting signal $S_{DSI}$ according to the positional variation of the touch event (for example, according to the sensing signal $S_S$ or the sensing signal $S_S'$). Because in some applications, such as games, Google maps, etc., the electronic device changes the display picture displayed by the display screen according to the movement of the user's finger sensed by the touch-sensing module. The processing module 130 determines whether to increase the screen-refresh rate according to the moving distance of the touch event for improving the fluency of the display picture but avoiding the excessive power consumption. When the moving distance of the touch event is less than a predetermined distance, e.g. 1 cm, the sensing module 110 outputs the sensing signal $S_S'$, and the processing module 130 determines that the touch event is only an accidental touch, or that the user is using the touch object to touch the touch-sensing module rather than to move, according to the sensing signal $S_S'$. Then the processing module 130 does not output the transmitting signal $S_{DSI}$, and uses the original screen-refresh rate, i.e. 60 Hz, to refresh the screen of the display module 150. Otherwise, when the moving distance of the touch event is greater than or equal to the predetermined distance, the sensing module 110 outputs the sensing signal $S_S$, the processing module 130 outputs the transmitting signal $S_{DSI}$ according to the sensing signal $S_S$. The driving module 140 determines the subsequent frame according to the transmitting signal $S_{DSI}$, which means that the driving module 140 uses the screen-refresh rate of 120 Hz to refresh the screen of the display module 150.

According to another embodiment of the invention, when the sensing module 110 is a gyroscope, a magnetometer, an accelerometer, or a touch-sensing module, the processing module 130 further determines whether to output the transmitting signal $S_{DSI}$ according to the movement of the electronic device. For example, when the sensing module 110 is a gyroscope, a variation threshold may be pre-set to 1 cm. When the spatial variation corresponding to any axis, any two axes, or all the x/y/z axes of the electronic device is greater than or equal to the variation threshold, the sensing module 110 outputs the sensing signal $S_S$. The processing module 130 outputs the transmitting signal $S_{DSI}$ according to the sensing signal $S_S$. The driving module 140 determines the subsequent frame according to the transmitting signal $S_{DSI}$, which means that the driving module 140 uses the screen-refresh rate of 120 Hz to refresh the screen of the display module 150. When the spatial variation is less than the variation threshold, the sensing module 110 does not output the sensing signal $S_S$ or outputs the sensing signal $S_S'$ which is different from the sensing signal $S_S$. The processing module 130 stops outputting the transmitting signal $S_{DSI}$ according to the sensing signal $S_S'$ or when there is no sensing signal $S_S$, and still uses the original screen-refresh rate of 60 Hz to refresh the screen of the display module 150.

In another embodiment of the invention, when the sensing module 110 is a magnetometer, a variation threshold of the magnetic field direction may be pre-set, such as an angle of 15 degrees. When the sensing module 110 senses that the spatial variation of the magnetic field direction is greater than or equal to the variation threshold, the sensing module 110 outputs the sensing signal $S_S$, and the processing module 130 outputs the transmitting signal $S_{DSI}$ according to the sensing signal $S_S$. The driving module 140 determines the subsequent frame according to the transmitting signal $_{DSI}$, which means that the driving module 140 uses the screen-refresh rate of 120 Hz to refresh the screen of the display module 150. Otherwise, when the spatial variation is less than the variation threshold, the sensing module 110 does not output the sensing signal $S_S$, or it outputs the sensing signal $S_S'$ which is different from the sensing signal $S_S$. The processing module 130 stops outputting the transmitting signal $S_{DSI}$ according to the sensing signal $S_S'$ or when there is no sensing signal $S_S$. The processing module 130 still uses the original screen-refresh rate of 60 Hz to refresh the screen of the display module 150.

In another embodiment of the invention, when the sensing module 110 is an accelerometer, the threshold of the acceleration may be pre-set to 0.1 g. When the sensing module 110 senses that the acceleration is greater than or equal to the threshold, the sensing module 110 outputs the sensing signal $S_S$, and the processing module 130 outputs the transmitting signal $S_{DSI}$ according to the sensing signal $S_S$. The driving module 140 determines the subsequent frame according to the transmitting signal $S_{DSI}$, which means that the driving module 140 uses the screen-refresh rate of 120 Hz to refresh the screen of the display module 150. When the acceleration is less than the variation threshold, the sensing module 110 does not output the sensing signal $S_S$, or it outputs the sensing signal $S_S'$ which is different from the sensing signal $S_S$. The processing module 130 stops outputting the transmitting signal $S_{DSI}$ according to the sensing signal $S_S'$ or when there is no sensing signal $S_S$. The processing module 130 still uses the original screen-refresh rate of 60 Hz to refresh the screen of the display module 150.

Figure 5:
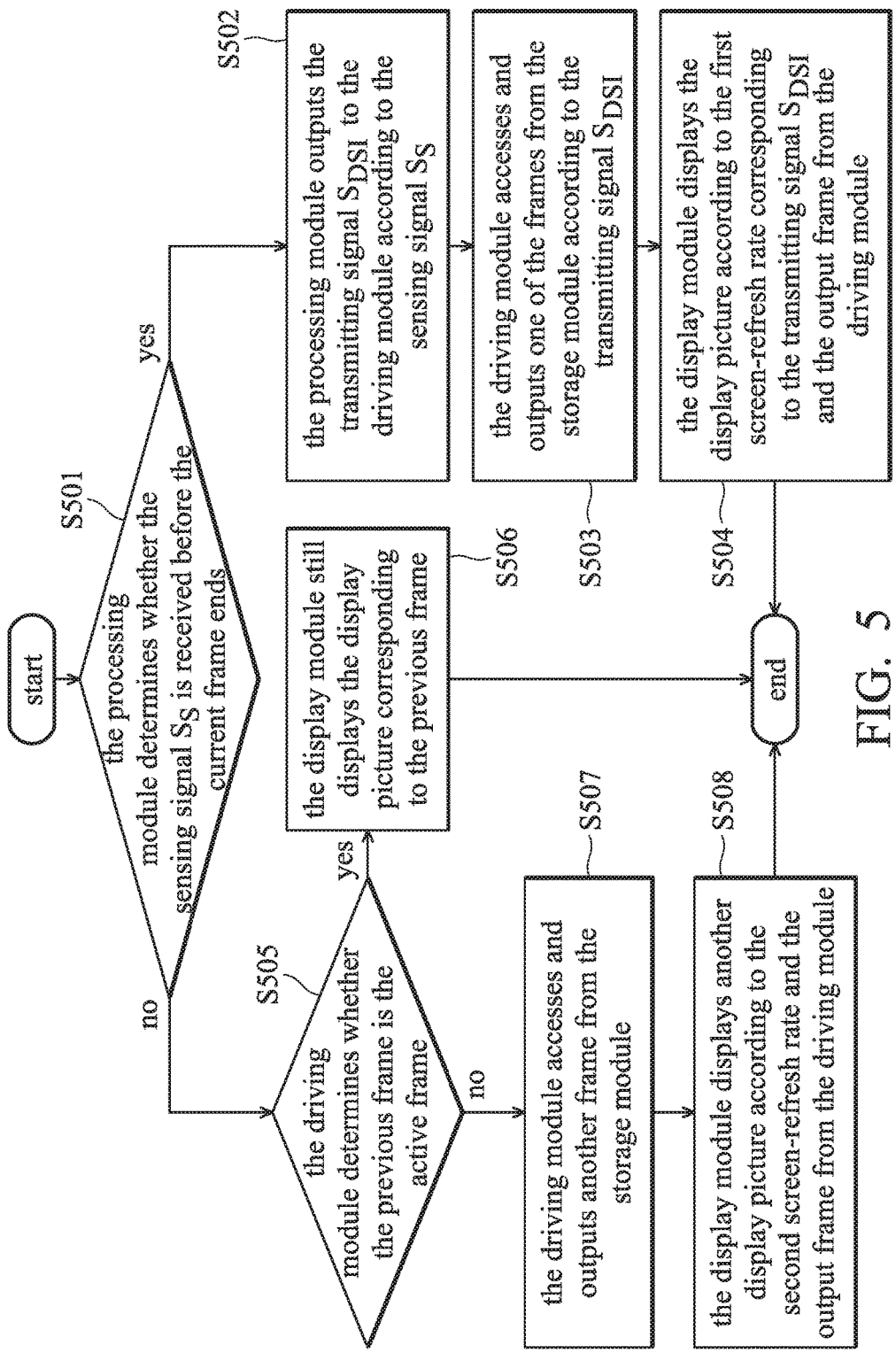
FIG. 5 is a flow chart of the method for controlling the screen-refresh rate in accordance with an embodiment of the present invention.

Please refer to FIG. 5 with FIG. 1. FIG. 5 is a flow chart of the method for controlling the screen-refresh rate in accordance with an embodiment of the present invention. In step S501, the processing module 130 determines whether the sensing signal $S_S$ is received before the current frame ends. When the processing module 130 receives the sensing signal $S_S$ before the current frame ends, the flow proceeds to step S502, the processing module 130 outputs the transmitting signal $S_{DSI}$ to the driving module 140 according to the sensing signal $S_S$. The transmitting signal $S_{DSI}$ corresponds to the first screen-refresh rate. In step S503, after the driving module 140 receives the transmitting signal $S_{DSI}$, the driving module 140 accesses and outputs one of the frames from the storage module 120 according to the transmitting signal $S_{DSI}$. In step S504, the display module 150 displays the display picture according to the first screen-refresh rate corresponding to the transmitting signal $S_{DSI}$ and the output frame from the driving module 140.

Otherwise, when the processing module 130 does not receive the sensing signal $S_S$ from the sensing module 110 or when the processing module 130 receive the sensing signal $S_S'$ from the sensing module 110 before the current frame ends, the flow proceeds to step S505, the driving module 140 determines whether the previous frame is the frame that is accessed and output from the storage module 120, i.e. the driving module 140 determines whether the previous frame is the active frame. If the previous frame is the active frame, the flow proceeds to step S506, the driving module 140 does not access and output the frame from the storage module 120 in the current grid, and the display module 150 still displays the display picture corresponding to the previous frame. Otherwise, when the previous frame is a skip frame, the flow proceeds to step S507, the driving module 140 accesses and outputs another frame from the storage module 120. Then in step S508, the display module 150 displays another display picture according to the second screen-refresh rate and the output frame from the driving module 140. The second screen-refresh rate is less than the first screen-refresh rate.

As described above, according to the electronic device and the method for controlling the screen-refresh rate provided herein, when the sensing module senses an action by the electronic device, the sensing module outputs a sensing signal to the processing module to make the processing module enable the driving module to continuously output the plurality of frames to accomplish the purpose of increasing the screen-refresh rate. Otherwise, when the sensing module does not receive a sensing signal or the touch object only touches the touch-sensing module rather than moving, and the screen-refresh rate of the display module maintains the lower screen-refresh rate for reducing power consumption. Furthermore, comparing the prior art with the present invention, the power consumption may be reduced for saving energy by using an active frame and a skip frame interchangeably to implement the lower screen-refresh rate.

It should be noted that, for reducing power consumption, rather than adjusting the screen-refresh rate, the brightness of the display module 150 may be adjusted according to the sensing signal $S_S$ provided by the sensing module 110 shown in FIG. 1. Specifically, the brightness of the screen of the electronic device 100 may be set to a lower brightness value first. When the sensing module 110 senses that the spatial variation corresponding to any axis, any two axes, or all the x/y/z axes of the electronic device, the spatial variation of the magnetic field directions of the magnetometer, or the acceleration is greater than or equal to the threshold, the sensing module 110 outputs the sensing signal $S_S$. The processing module 130 outputs the transmitting signal $S_{DSI}$ according to the sensing signal $S_S$, which makes the driving module 140 increase the brightness of the display module 150 according to the transmitting signal $S_{DSI}$. The increased brightness value may be set by the user, and the setting is stored in the storage module 120. In another embodiment, the electronic device further includes a timer, configured to start timing when the display module configures the user's pre-set brightness value. When the timer expires and the processing module does not receive the sensing signal within a predetermined time, the brightness of the display module is reset to the original brightness. Furthermore, there may be a lot of brightness values pre-set by the user, and there may be a lot of corresponding thresholds. The electronic device 100 further compares the moving distance of the touch event, the spatial variation corresponding to any axis, any two axes, or all the x/y/z axes of the electronic device, the spatial variation of the magnetic field directions of the magnetometer, or the acceleration with a plurality of threshold values, and determines the final brightness according to the results of these comparisons. The practice is similar to the method for adjusting the screen-refresh rate as described above, and thus it is not described herein for brevity.

The above description is presented to allow persons skilled in the art to practice the present invention according to the specific application and the needs of the content. The various modifications of the embodiments will be obvious to person skilled in the art, and the basic principles of the described definitions can be applied to other embodiments. Thus, the present invention is not limited by the specific embodiments, but in line with the widest scope consistent with the disclosed principles and features. For providing a thorough understanding of the present invention, numerous specific details are described in the above detailed description. However, person skilled in the art will understand that the present invention is implemented.

The embodiments of the data transmission methods of the present invention can be implemented by hardware, software coding, or a combination of the two. For example, the embodiment of the present invention can be integrated into a circuit with a video compression chip or video compression software for implementing the code. The embodiment of the present invention can be code which is implemented in the Digital Signal Processor (DSP). The present invention may also be related to a variety of functions implemented in a computer processor, a digital signal processor, a microprocessor, or a Field Programmable Gate Array (FPGA). The present invention can be implemented by a processor executing machine-readable software code or firmware code. The software code or firmware code can be any type of programming language, or decoded by different target platforms. However, the software code and other software code of different types or programming languages are still within the scope and spirit of the invention.

It will be apparent to those skilled in the art that various modifications and variations can be made to the structure disclosed without departing from the scope or spirit of the invention. In view of the foregoing, it is intended that the present invention covers modifications and variations of this invention, provided they fall within the scope of the following claims and their equivalents.

What is claimed is:

1. An electronic device, comprising:
    a memory, configured to store a plurality of frames;
    a sensing circuit, configured to output a sensing signal according to an action by the electronic device;
    a processing circuit, configured to output a transmitting signal according to the sensing signal, wherein the transmitting signal corresponds to a first screen-refresh rate;
    a driving circuit, configured to determine a subsequent frame according to either the transmitting signal or a driving signal before a current frame ends, wherein the driving signal corresponds to a second screen-refresh rate; and
    a display circuit, configured to display a display picture corresponding to the subsequent frame according to the subsequent frame and either the first screen-refresh rate or the second screen-refresh rate.

2. The electronic device as claimed in claim 1, wherein the first screen-refresh rate is greater than the second screen-refresh rate.

3. The electronic device as claimed in claim 2, wherein when the driving circuit receives the transmitting signal before the current frame ends, the driving circuit accesses and outputs one of the plurality of frames from the memory as the subsequent frame, and the display circuit displays the display picture corresponding to the subsequent frame according to the first screen-refresh rate and the subsequent frame.

4. The electronic device as claimed in claim 2, wherein when the driving circuit does not receive the transmitting signal before the current frame ends, the driving circuit instructs the display circuit to display a corresponding display picture according to the second screen-refresh rate and the plurality of frames stored in the memory.

5. The electronic device as claimed in claim 2, wherein the first screen-refresh rate is 120Hz, and the second screen-refresh rate is 60Hz.

6. The electronic device as claimed in claim 1, wherein the sensing circuit is a gyroscope, a magnetometer, an accelerometer, or a touch-sensing module.

7. The electronic device as claimed in claim 6, wherein when the sensing circuit is a touch-sensing module, the processing circuit further determines a distance between a start position and an end position corresponding to a touch event on the touch-sensing module, when the distance is less than a predetermined distance, the processing circuit does not output the transmitting signal, and the driving circuit determines the subsequent frame according to the driving signal, and when the distance is greater than or equal to the predetermined distance, the processing circuit outputs the transmitting signal, and the driving circuit determines the subsequent frame according to the transmitting signal.

8. The electronic device as claimed in claim 6, wherein when the sensing circuit is a gyroscope, the processing circuit further determines a spatial variation corresponding to any axis, any two axes, or all the x/y/z axes of the electronic device, when the spatial variation is less than a predetermined threshold, the processing circuit does not output the transmitting signal, and the driving circuit continuously determines the subsequent frame according to the driving signal, and when the spatial variation is greater than or equal to the predetermined threshold, the processing circuit outputs the transmitting signal, and the driving circuit determines the subsequent frame according to the transmitting signal.

9. The electronic device as claimed in claim 6, wherein when the sensing circuit is a magnetometer, the processing circuit further determines a spatial variation corresponding to magnetic field directions of the magnetometer, and when the spatial variation is less than a predetermined threshold, the processing circuit does not output the transmitting signal, and the driving circuit continuously determines the subsequent frame according to the driving signal, and when the spatial variation is greater than or equal to the predetermined threshold, the processing circuit outputs the transmitting signal, and the driving circuit determines the subsequent frame according to the transmitting signal.

10. The electronic device as claimed in claim 6, wherein when the sensing circuit is an accelerometer, the processing circuit further determines an acceleration of the electronic device, when the acceleration is less than a predetermined threshold, the processing circuit does not output the transmitting signal, and the driving circuit determines the subsequent frame according to the driving signal, and when the acceleration is greater than or equal to the predetermined threshold, the processing circuit outputs the transmitting signal, and the driving circuit determines the subsequent frame according to the transmitting signal.

11. A method for controlling a screen-refresh rate, adapted to an electronic device, comprising:
outputting a sensing signal according to an action by the electronic device by a sensing module;
outputting a transmitting signal according to the sensing signal by a processing module, wherein the transmitting signal corresponds to a first screen-refresh rate;
determining a subsequent frame according to either the transmitting signal or a driving signal before a current frame ends by a driving module, wherein the driving signal corresponds to a second screen-refresh rate; and
displaying a display picture corresponding to the subsequent frame according to the subsequent frame and either the first screen-refresh rate or the second screen-refresh rate by a display module.

12. The method as claimed in claim 11, wherein the first screen-refresh rate is greater than the second screen-refresh rate.

13. The method as claimed in claim 12, wherein the step of determining the subsequent frame by the driving module according to the transmitting signal or the driving signal further comprising:
accessing and outputting one of a plurality of frames from a storage module as the subsequent frame by the driving module, and displaying the display picture corresponding to the subsequent frame according to the first screen-refresh rate and the subsequent frame by the display module when the driving module receives the transmitting signal before the current frame ends.

14. The method as claimed in claim 12, wherein the step of determining the subsequent frame by the driving module according to the transmitting signal or the driving signal further comprising:
instructing the display module to display a corresponding display picture according to the second screen-refresh rate and the plurality of frames stored in the storage module by the driving module when the driving module does not receive the transmitting signal before the current frame ends.

15. The method as claimed in claim 12, wherein the first screen-refresh rate is 120Hz, and the second screen-refresh rate is 60Hz.

16. The method as claimed in claim 11, wherein the sensing module is a gyroscope, a magnetometer, an accelerometer, or a touch-sensing module.

17. The method as claimed in claim 16, wherein when the sensing module is a touch-sensing module, the method further comprising:
determining a distance between a start position and an end position corresponding to a touch event on the touch-sensing module by the processing module, when the distance is less than a predetermined distance, the processing module does not output the transmitting signal, and the driving module continuously determines the subsequent frame according to the driving signal, and when the distance is greater than the predetermined distance, the processing module outputs the transmitting signal, and the driving module determines the subsequent frame according to the transmitting signal.

18. The method as claimed in claim 16, wherein when the sensing module is a gyroscope, the method further comprising:
determining a spatial variation corresponding to any axis, any two axes, or all the x/y/z axes of the electronic device by the processing module when the spatial variation is less than a predetermined threshold, the processing module does not output the transmitting signal, and the driving module continuously determines the subsequent frame according to the driving signal, and when the spatial variation is greater than or equal to the predetermined threshold, the processing module outputs the transmitting signal, and the driving module determines the subsequent frame according to the transmitting signal.

19. The method as claimed in claim 16, wherein when the sensing module is a magnetometer, the method further comprises:

determining a spatial variation corresponding to magnetic field directions of the magnetometer by the processing module, when the spatial variation is less than a predetermined threshold, the processing module does not output the transmitting signal, and the driving module continuously determines the subsequent frame according to the driving signal, and when the spatial variation is greater than or equal to the predetermined threshold, the processing module outputs the transmitting signal, and the driving module determines the subsequent frame according to the transmitting signal.

20. The method as claimed in claim 16, wherein when the sensing module is an accelerometer, the method further comprising:

determining an acceleration of the magnetometer by the processing module, when the acceleration is less than a predetermined threshold, the processing module does not output the transmitting signal, and the driving module continuously determines the subsequent frame according to the driving signal, and when the acceleration is greater than or equal to the predetermined threshold, the processing module outputs the transmitting signal, and the driving module determines the subsequent frame according to the transmitting signal.

* * * * *